United States Patent
Ohishi

(10) Patent No.: US 7,289,067 B2
(45) Date of Patent: Oct. 30, 2007

(54) WIRELESS TAG GATE READER

(75) Inventor: Satoshi Ohishi, Mishima (JP)

(73) Assignee: Toshiba Tec Corporation, Tokyo (JP)

( * ) Notice: Subject to any disclaimer, the term of this patent is extended or adjusted under 35 U.S.C. 154(b) by 76 days.

(21) Appl. No.: 11/364,917

(22) Filed: Mar. 1, 2006

(65) Prior Publication Data
US 2007/0080880 A1    Apr. 12, 2007

(30) Foreign Application Priority Data
Sep. 22, 2005  (JP) .............................. 2005-276597

(51) Int. Cl.
*H01Q 1/38*    (2006.01)
(52) U.S. Cl. .............................. 343/700 MS; 343/810; 343/754; 343/757
(58) Field of Classification Search ......... 343/700 MS, 343/810
See application file for complete search history.

(56) References Cited

U.S. PATENT DOCUMENTS 6,448,930 B1* 9/2002 Judd ................... 343/700 MS
2004/0027284 A1* 2/2004 Leeper et al. ......... 343/700 MS
2004/0183726 A1* 9/2004 Theobold ............. 343/700 MS
2006/0057397 A1* 3/2006 Awad et al. ............. 428/423.1
2006/0181461 A1* 8/2006 Leeper et al. ......... 343/700 MS

FOREIGN PATENT DOCUMENTS

JP       2002-271229        9/2002

* cited by examiner

*Primary Examiner*—Trinh Vo Dinh
(74) *Attorney, Agent, or Firm*—Amin, Turocy & Calvin, LLP

(57) ABSTRACT

In a wireless tag gate reader that includes a plurality of antenna pairs that is disposed oppositely to each other so as to form a path space where a recognition target with a wireless tag goes through and a wireless tag reader connected to each of the antenna pairs, antenna pairs disposed at both ends of the path space of the wireless tag gate reader are disposed with a tilt angle so as to expand the width at the both ends of the path space.

4 Claims, 6 Drawing Sheets

WIRELESS TAG GATE READER

CROSS-REFERENCE TO RELATED APPLICATION

The application is based upon and claims the benefit of priority from the prior Japanese Patent Application No. 2005-276597, filed on Sep. 22, 2005, the entire contents of which are incorporated herein by reference.

BACKGROUND OF THE INVENTION

1. Field of the Invention

The invention relates to a gate reader that reads information from a wireless tag, in particular, a gate reading antenna.

2. Description of the Related Art

A technology of a wireless tag as an automatic recognition technology is superior to a popular bar-code system in that non-contact and long distance reading can be realized. As a product that makes use of the long distance readability, an antitheft wireless tag gate reader (hereinafter, referred to as a gate reader) is well known. The gate reader is a device that communicates with a wireless tag attached to a passenger or an article that goes through the gate reader to read information in the wireless tag. An existing gate reader, as shown typically in FIG. 1, reads information recorded in a wireless tag that goes through between reader antennas 61 disposed facing each other. In the case of the reader antennas 61, antennas are mounted in three stages in an up and down direction.

A wireless tag 72, as shown in FIG. 2, is constituted including an IC chip 71 and a tag antenna 73 connected thereto. A communication time during which an existing gate reader reads information in the wireless tag 72, depending on a communication procedure and an amount of data, takes at least several milliseconds to several tens milliseconds. A recognition target (not shown in the drawing) that is a person or an article with the wireless tag 72 attached thereto has to stay in or go through a read zone at least during the read time. Accordingly, when a transit speed (walking speed, transportation speed) is high, a sufficient read time cannot be secured, resulting in incapability of reading.

When a transit speed is too high to be sufficient in the read time, generally, as shown in FIG. 3, a plurality of antennas 81a, 81b and 81c is arranged in a transit direction to lengthen a communication zone. However, in this case, the gate reader 81 becomes very large. As a method of solving this, Japanese Patent Publication No. 2002-271229 for instance discloses that the directivity of an antenna is altered. In this method, the directivity of an antenna can be varied mechanically or electrically to narrow a read zone of the antenna. However, it is intended to narrow a read zone of the antenna but not to expand the read zone and to miniaturize a device size.

SUMMARY OF THE INVENTION

Accordingly, the invention was carried out in view of the above-mentioned situations and an advantage of the invention is to provide a gate reader that is provided with a more miniaturized antenna and thereby can secure a wider read zone and assuredly read information of the wireless tag even when it goes through rapidly.

To achieve the above advantage, one aspect of the invention is to provide a wireless tag gate reader that includes a plurality of antenna pairs that is disposed oppositely to each other so as to form a path space where a recognition target with the wireless tag goes through and a wireless tag reader connected to the antenna pairs. Furthermore, of the plurality of antenna pairs disposed with each other faced, the antenna pairs disposed at both ends of the path space are arranged with a tilt angle so as to expand a width of the path space at the both ends thereof.

Furthermore, to achieve the above advantage, one aspect of the invention is to provide a wireless tag gate reader where the tilt angle is set to or less than an angle at which a demarcation line that demarks a certified read zone of antennas that constitute the antenna pairs comes substantially perpendicular to a passing direction of the recognition target.

According to the embodiment of the invention, at both ends of a plurality of antenna pairs arranged so as to form a path space where a wireless tag goes through, the antenna pairs are disposed tilted. Thereby, a radio wave can be radiated over a range longer than a length of the path space formed with a plurality of antenna pairs. Accordingly, with a small gate antenna, a wider read zone can be secured. As a result, the wireless tag gate reader according to the invention can provide a gate reader by which the recognition rate of the wireless tag is improved even when a passing speed of a recognition target is high.

DETAILED DESCRIPTION OF THE INVENTION

Figure 1:
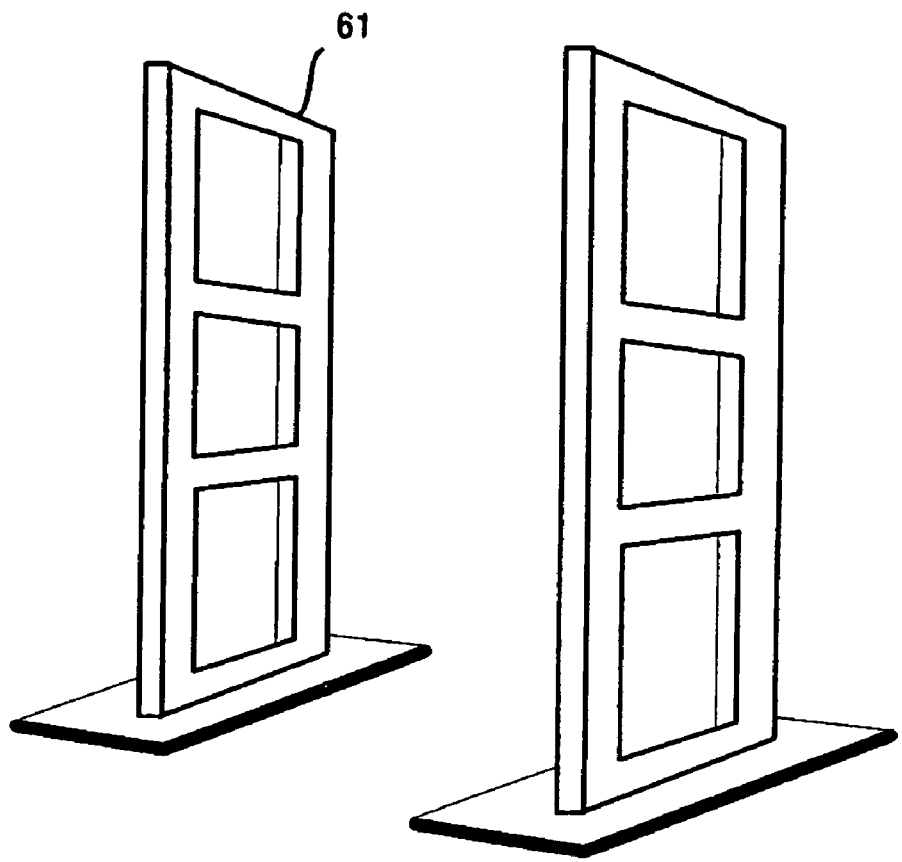
FIG. 1 is a perspective view showing a configuration of an existing wireless tag gate.
Figure 2:
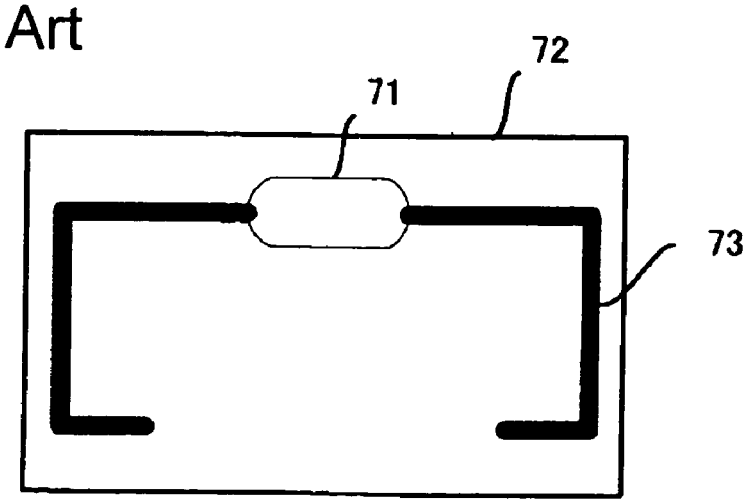
FIG. 2 is a schematic configuration diagram of a so far known wireless tag.
Figure 3:
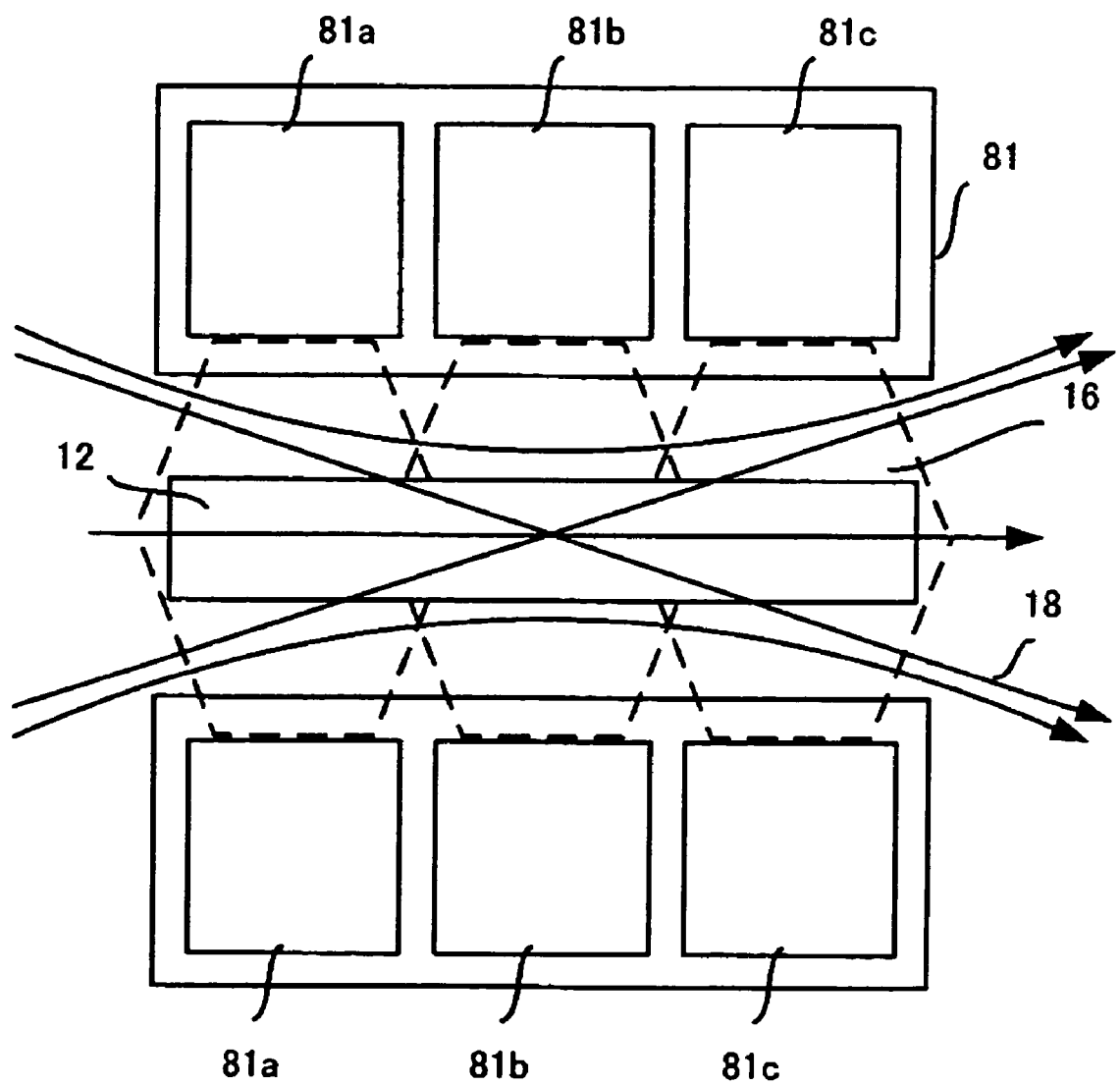
FIG. 3 is a schematic configuration diagram of an antenna arrangement of a so far known wireless tag gate antenna.
Figure 4:
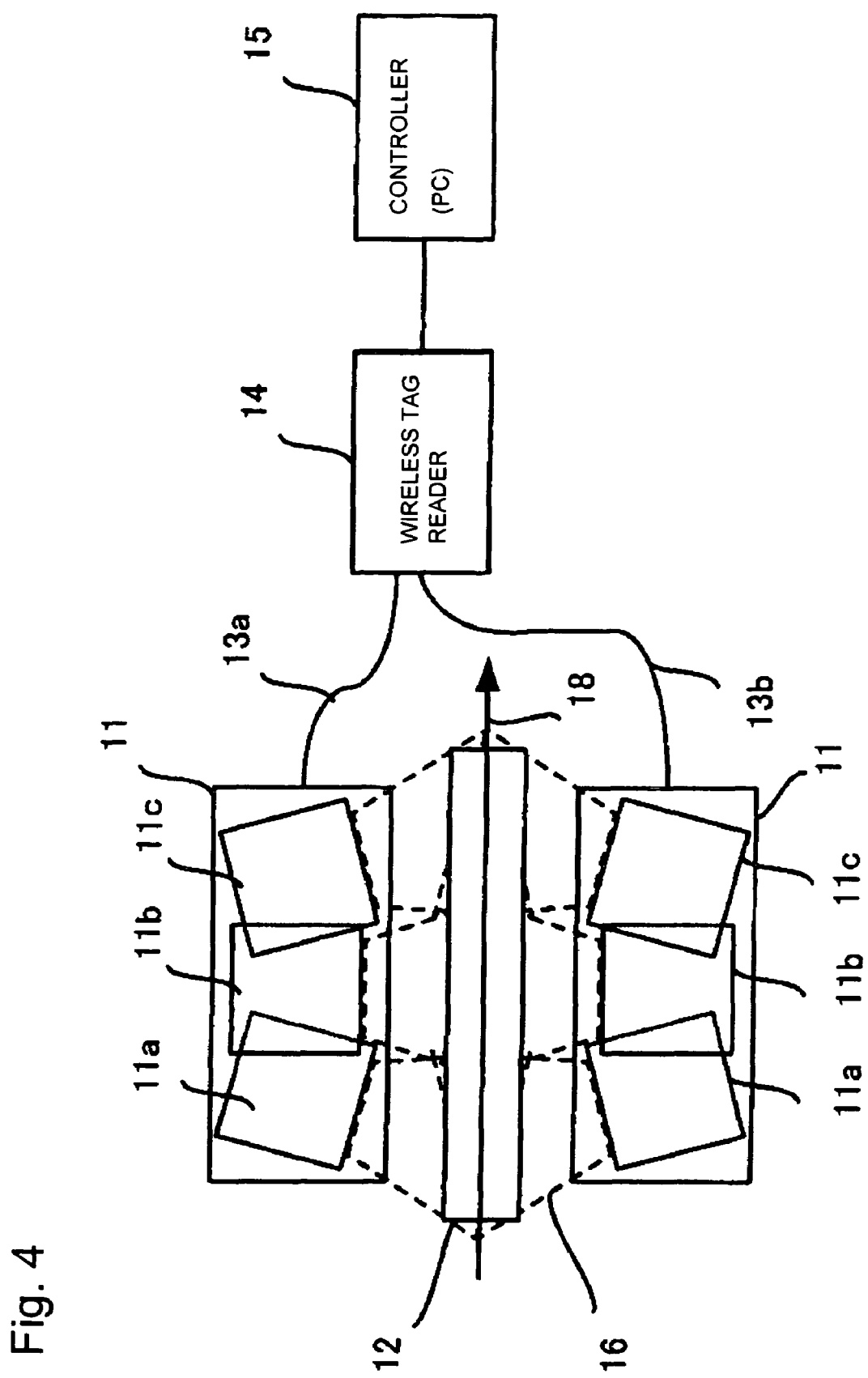
FIG. 4 is a block diagram showing one embodiment of a wireless tag gate reader according to the invention.

In what follows, an embodiment according to the invention will be described. FIG. 4 shows a block configuration of a gate reader to which the invention is applied. A wireless tag gate 11 is constituted of three antenna pairs 11a-11a, 11b-11b and 11c-11c, and each of the antenna pairs is disposed opposite to each other so as to form a path space 12 through which a recognition target (not shown in the drawing) with a wireless tag travels. The individual antennas 11a, 11b and 11c that constitute three antenna pairs are connected to a not-shown multiplexer/demultiplexer and respectively connected through control lines 13a and 13b to a wireless tag reader 14. Then, the wireless tag reader 14 is connected to a controller 15 made of a personal computer (PC) or the like.

Figure 5:
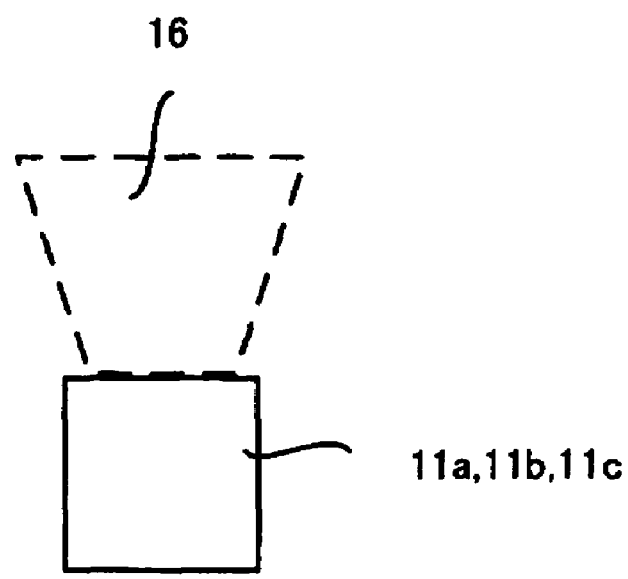
FIG. 5 is a diagram showing the directivity of a gate antenna used in the invention.
Figure 6:
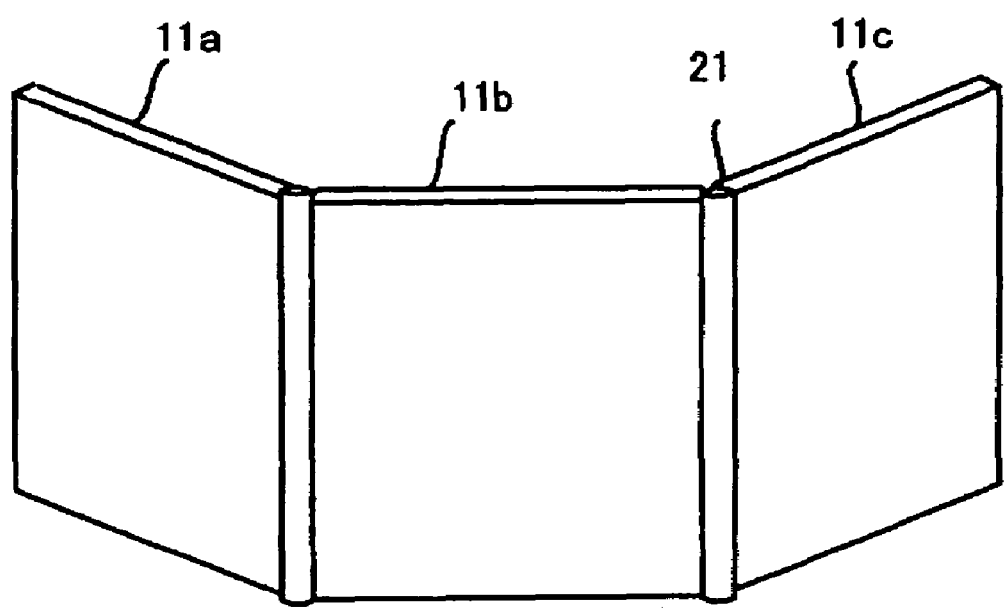
FIG. 6 is a perspective view showing a specific configuration of a wireless tag gate antenna according to the invention.

The individual antennas 11a, 11b and 11c that constitute the wireless tag gate 11, based on the same directivity characteristics, as shown in FIG. 5, have a certified read zone 16 where sure reading can be performed. FIG. 6 is a perspective view showing a specific structure of three antennas 11a, 11b and 11c that are disposed on one side of the path space 12. The respective antennas 11a, 11b and 11c are connected with a hinge 21 having a rotation axis in a vertical direction. Each of the antennas 11a and 11c on both sides can be bent at an arbitrary angle to the central antenna 11b and fixed at the angle.

Figure 7:
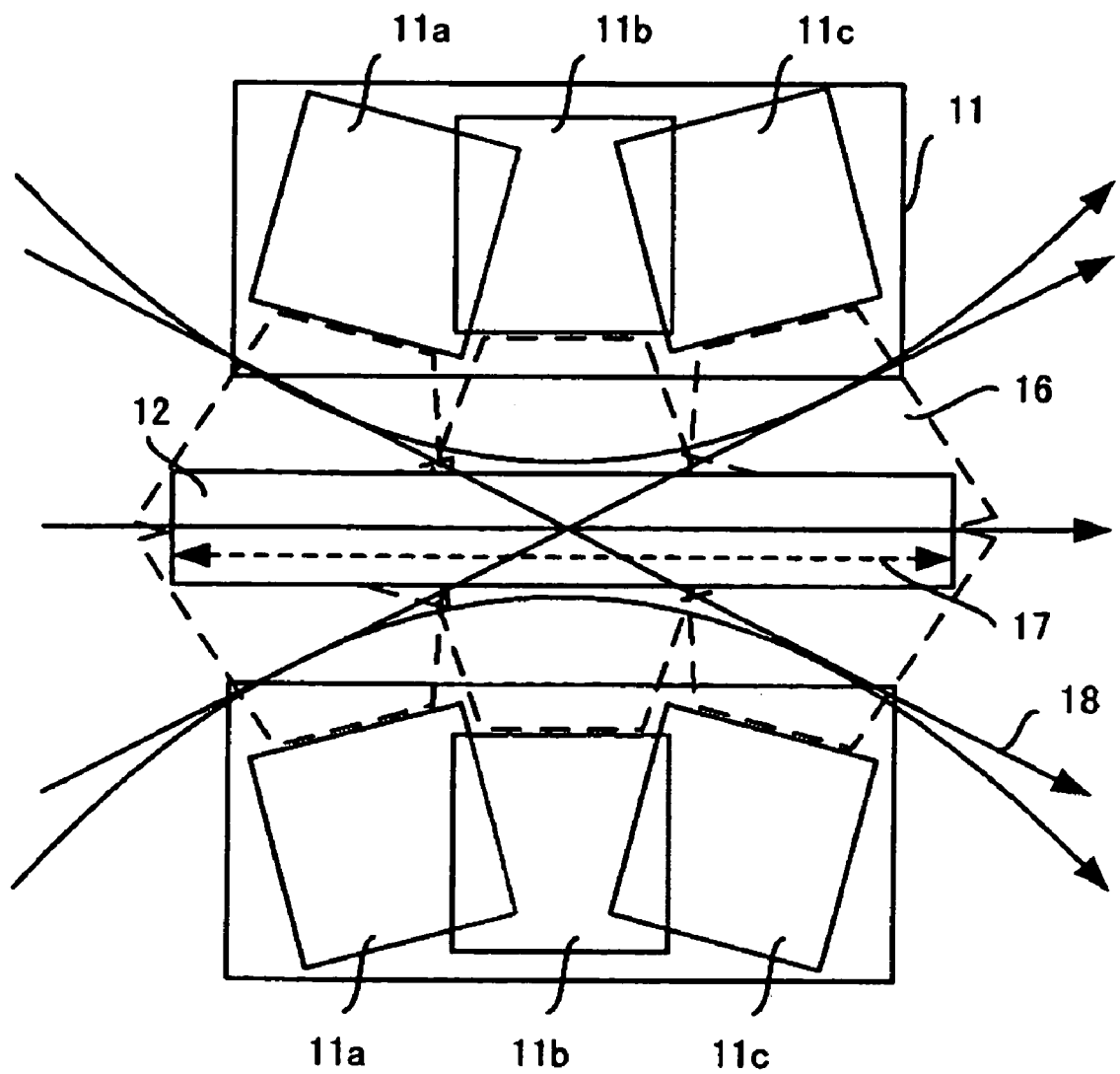
FIG. 7 is a top view showing a relationship between a certified read zone and a path space of an antenna constituting a gate of the invention.

FIG. 7 is a top view showing a relationship between the certified read zone 16 of the respective antennas 11a, 11b and 11c that constitute the wireless tag gate 11 and the path space 12 where the wireless tag travels. As obvious from the drawing, the antennas 11a on an entrance side of the path space 12 shown in a left side of FIG. 7 and the antennas 11c on an exit side shown in a right side of FIG. 7 do not face in parallel and are disposed with a tilt angle so that a width of the path space 12 may expand at both ends. As a result, the certified read zone 16 of the antennas 11a and the antennas 11c are formed not vertically to a longer direction of the path space 12 but tilted thereto. Accordingly, the maximum read available transit distance 17 in the longer direction of the path space 12 becomes longer than a length in a longer direction of the path space 12 of the three antennas 11a, 11b and 11c, that is a width of the gate 11.

Accordingly, according to the embodiment of the invention, a read zone larger than a width of the wireless tag gate 11 can be obtained and at the same time a width of the wireless tag gate 11 corresponding to the same transit speed of a recognition target can be made smaller than ever. Accordingly, a degree of freedom of installation site can be expanded as well.

Figure 8:
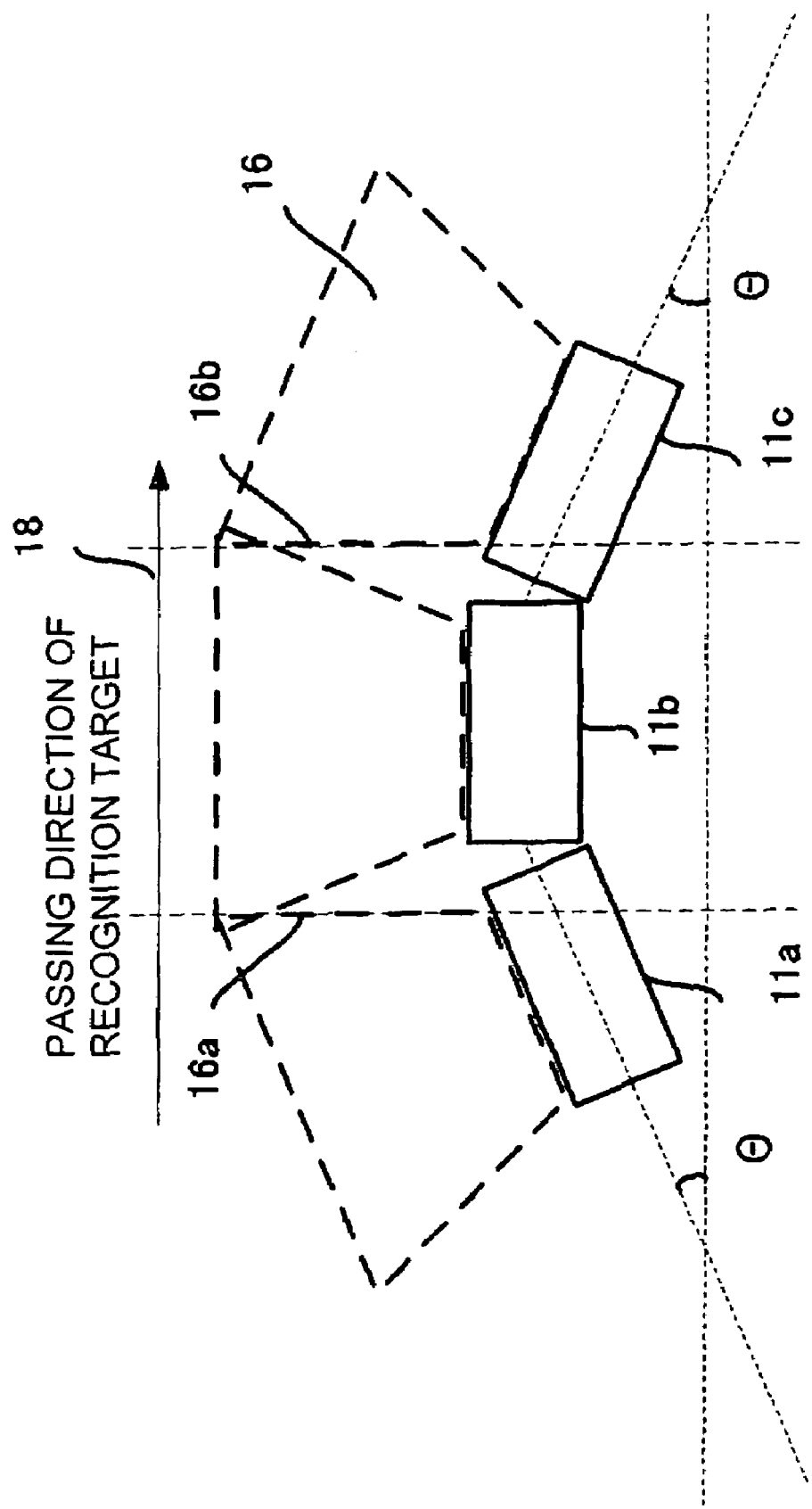
FIG. 8 is an explanatory diagram of an antenna tilt angle in a gate according to the invention.

In the next place, a tilt angle of the antennas 11a and 11c disposed at openings will be considered. As shown in FIG. 8, in a case where an angle when a demarcation line 16a or 16b of the certified read zone 16 of the respective antennas 11a and 11c is in same direction as a direction perpendicular to a passing direction of a recognition target with a wireless tag is expressed with θ, when the tilt angle is set same or less than θ, the certified read zone 16 can be superposed each other, and thereby the wireless tag can be assuredly read.

As mentioned above, in the wireless tag gate reader according to the invention, since the antenna pairs 11a-11a and 11c-11c disposed at both ends of the path space 12 formed by the gate 11 are disposed tilted so that a width of the path space 12 may be expanded at both ends thereof, the wireless tag can be read in a zone larger than a device size of the wireless tag gate 11. Accordingly, when compared with an existing technology at the same installation space, the wireless tag can be read even at faster transit speeds. Furthermore, when a device size corresponding to the same transit speed is compared with that of the existing technology, the gate size can be miniaturized and thereby a degree of freedom of the installation space can be expanded.

Furthermore, since the gate 11 according to the embodiment has wider entrance and exit openings of the path space 12, a recognition target can easily change a direction when entering or exiting the gate 11, resulting in a smooth passage.

In the invention, the embodiment is not restricted to the above one as it is, and when implementing the invention can be embodied within a range that does not deviate from a gist thereof. That is, in the embodiment, a gate that is constituted with three wireless tag gate antennas that face each other was described. However, it goes without saying that the same technical consideration can be applied to a case where a number of the wireless tag gate antennas that face each other is three or more and the same technical consideration can be applied as well to a configuration where there is no opposite antennas other than at the openings, that is, a configuration that is constituted only of two pairs of wireless tag gate antennas that face each other in a tilting manner.

What is claimed is:

1. A wireless tag gate reader, comprising:
   a plurality of antenna pairs that is disposed oppositely to each other so as to form a path space where a recognition target with a wireless tag goes through;
   a wireless tag reader connected to each of the antenna pair; and
   at least one pair of the plurality of antenna pairs respectively disposed at both ends of the path space with a tilt angle to a direction where the recognition target goes through so as to expand a width at the both ends of the path space.

2. The wireless tag reader according to claim 1, wherein the tilt angle is set equal to or less than an angle where demarcation lines that demarcate a certified read zone of an antenna constituting the antenna pair are substantially perpendicular to a travel direction of the recognition target.

3. The wireless tag reader according to claim 1, wherein the plurality of antenna pairs is disposed with a tilt angle that makes an entrance width wider on an entrance side of the recognition target, with a tilt angle in parallel with a travel direction of the recognition target in an intermediate passage portion and with a tilt angle that makes an exit width wider on an exit side of the recognition target.

4. The wireless tag reader according to claim 1, wherein each of the antenna pairs is disposed with a tilt angle that makes an entrance width wider on an entrance side of the recognition target and with a tilt angle that makes an exit width wider on an exit side of the recognition target.

* * * * *